US009529129B2

(12) United States Patent
Zhao et al.

(10) Patent No.: US 9,529,129 B2
(45) Date of Patent: *Dec. 27, 2016

(54) BROADBAND OPTICAL LIMITER BASED ON NANO-GRAPHENE AND METHOD OF FABRICATING SAME

(75) Inventors: Wei Zhao, Little Rock, AR (US); Boshan Zhao, Little Rock, AR (US)

(73) Assignee: BOARD OF TRUSTEES OF THE UNIVERSITY OF ARKANSAS, Little Rock, AR (US)

(*) Notice: Subject to any disclaimer, the term of this patent is extended or adjusted under 35 U.S.C. 154(b) by 624 days.

This patent is subject to a terminal disclaimer.

(21) Appl. No.: 12/766,309

(22) Filed: Apr. 23, 2010

(65) Prior Publication Data
US 2011/0170208 A1 Jul. 14, 2011

Related U.S. Application Data

(60) Provisional application No. 61/214,762, filed on Apr. 28, 2009.

(51) Int. Cl.
| | | |
|---|---|---|
| B32B 9/00 | (2006.01) |
| G02B 5/23 | (2006.01) |
| C01B 31/04 | (2006.01) |
| F41H 5/00 | (2006.01) |
| G02F 1/35 | (2006.01) |
| G02B 1/06 | (2006.01) |

(52) U.S. Cl.
CPC ............ *G02B 5/23* (2013.01); *C01B 31/0438* (2013.01); *F41H 5/00* (2013.01); *G02F 1/3523* (2013.01); *G02B 1/06* (2013.01); *G02F 2202/36* (2013.01); *G02F 2203/52* (2013.01); *Y10T 428/30* (2015.01)

(58) Field of Classification Search
CPC .......................... C01B 31/0438; Y10T 428/30
USPC ....... 428/408; 423/447.1, 447.2, 448, 445 R; 252/500; 977/742
See application file for complete search history.

(56) References Cited

U.S. PATENT DOCUMENTS

| | | | |
|---|---|---|---|
| 2001/0010809 A1* | 8/2001 | Haddon et al. ............ 423/447.2 |
| 2003/0122111 A1* | 7/2003 | Glatkowski .................. 252/500 |
| 2004/0040834 A1 | 3/2004 | Smalley et al. |
| 2006/0121185 A1* | 6/2006 | Xu et al. .................... 427/163.1 |
| 2007/0116628 A1 | 5/2007 | Shew et al. |
| 2007/0243124 A1 | 10/2007 | Baughman et al. |
| 2007/0284557 A1* | 12/2007 | Gruner et al. ............... 252/500 |
| 2009/0016199 A1 | 1/2009 | Eguro |
| 2009/0017211 A1 | 1/2009 | Gruner et al. |
| 2009/0059368 A1 | 3/2009 | Kamada |

(Continued)

OTHER PUBLICATIONS

Li, Q. et al., Broadband Optical Limiting and Two-photon Absorption Properties of Colloidal GaAs Nanocrystals, Opt. Exp., 2005, 13, P1833-38.

(Continued)

*Primary Examiner* — Daniel H Miller
(74) *Attorney, Agent, or Firm* — Tim Tingkang Xia, Esq.; Locke Lord LLP

(57) ABSTRACT

The present invention in one aspect relates to a low-cost, nano-graphene based broadband optical limiter with limiting properties superior to current standards, carbon fullerenes ($C_{60}$) solutions and carbon black suspensions. The broadband optical limiter includes a plurality of graphene nano-sheets, and a base material in which the plurality of graphene nano-sheets is distributed. The base material can be liquid or gel matrix.

13 Claims, 8 Drawing Sheets

(56) References Cited

U.S. PATENT DOCUMENTS

| | | | |
|---|---|---|---|
| 2009/0208743 A1* | 8/2009 | Pettit | 428/375 |
| 2010/0028681 A1* | 2/2010 | Dai et al. | 428/408 |
| 2012/0039344 A1* | 2/2012 | Kian | H01S 3/067 372/6 |

OTHER PUBLICATIONS

Boggess, Jr. T. F. et al., Simultaneous Measurement of the 2-Photon Coefficient and Free-Carrier Cross-Section above the Bandgap of Crystalline Silicon, IEEE J. Quantum Electron., 1986, 22, P360-368.
He, G. S. et al., Multiphoton Absorbing Materials: Molecular Designs, Characterizations, and Applications, Chem. Rev., 2008, 108, P1245-1330.
Ei-Sayed M. A., Some Interesting Properties of Metals Confined in Time and Nanometer Space of Different Shapes, Acc. Chem. Res., 2001, 34, P257-264.
Niyogi et al., Solution Properties of Graphite and Graphene, J. Am. Chem. Soc., 128, 2006, P7720-7721.
Yang et al., Two-Dimensional Graphene Nanoribbons, J. Am. Chem. Soc., 130, 2008, P4216-4217.
Sun Y. P, et al., "Organic and Inorganic Optical Limiting Materials From Fullerenes to Nanoparticles," Inter. Rev. Phys. Chem., 1999, pp. 43-90, vol. 18, Taylor & Francis Ltd., USA.
Wood G. L., et al., "Material Requirements for Optical Limiting," SPIE, 1992, pp. 2-14, vol. 1692, USA.
Mansour K., et al., "Nonlinear Optical Properties of Carbon-Black Suspensions (Ink)," J. Opt. Soc. Am. B, Jul. 1992 . 1992, pp. 1100-1109, vol. 9, Optical Society of America.
Hernandez F.E., et al., "Viscosity Dependence of Optical Limiting in Carbon Black Suspensions," Applied Optics, Feb. 20, 2002, pp. 1104-1107, vol. 41, Optical Society of America.
Geim K., et al., "The Rise of Graphene," Nature Materials, Mar. 2007, pp. 183-191, vol. 6, Nature Publishing Group.
Xiaolion Li, et al., "Chemically Derived, Ultrasmooth Graphene Nanoribbon Semiconductors," Science, Feb. 29, 2008, pp. 1229-1232, vol. 319.
Nair R. R., et al., "Fine Structure Constant Defines Visual Transparency of Graphene," Science, Jun. 6, 2008, pp. 1308, vol. 320.

Wang F., et al., "Gate-Variable Optical Transitions in Graphene," Science, Apr. 11, 2008, pp. 206-209, vol. 320.
Lu Y. H., et al., "Tuning the Electronic Structure of Graphene by an Organic Molecule," The Journal of Physical Chemistry B, 2009, pp. 2-5, vol. 113, American Chemical Society, USA.
Dubikovskiy V., et al. , "Large Nonlinear Refraction in InSb at 10 μm and the Effects of Auger Recombination," J. Opt. Soc. Am. B, 2008, pp. 223-235, vol. 25, Optical Society of America.
Boyd R. W., et al., Nonlinear Optics, 1992, pp. 229-231, Academic Press.
Zhibo Liu, et al., "Nonlinear Optical Properties of Graphene Oxide in Nanosecond and Picosecond Regimes," Applied Physics Letters, 2009, vol. 94, American Institute of Physics.
Xu Yanfei, et al., "A Graphene Hybrid Material Covalently Functionalized with Porphyrin: Synthesis and Optical Limiting Property," Advanced Materials, 2009, pp. 1275-1279, vol. 21, Wiley-VCH Verlag GmbH & Co.
Liu Zhi-Bo, et al., "Porphyrin and Fullerene Covalently Functionalized Graphene Hybrid Materials with Large Nonlinear Optical Properties," J. Phys. Chem. B, 2009, pp. 9681-9686, vol. 113, American Chemical Society.
Zhou Yong, et al., "Hydrothermal Dehydration for the "Green" Reduction of Exfoliated Graphene Oxide to Graphene and Demonstration of Tunable Optical Limiting Properties," Chem. Mater., 2009, 2950-2956,vol. 21, American Chemical Society.
Wang Jun, et al., Broadband Nonlinear Optical Response of Graphene Dispersions, Adv. Mater., 2009, pp. 2430-2435, vol. 21, Wiley-VCH Verlag GmbH & Co..
Dan Li, et al., "Processable Aqueous Dispersions of Graphene Nanosheets," Nature Nanotechnology, Feb. 2008, pp. 101-105, vol. 3, Nature Publishing Group.
Xu Yang, et al., "Double Stranded DNA-Single Walled Carbon Nanotube Hybrids for Optical Hydrogen Peroxide and Glucose Sensing," J. Phys. Chem. C., 2007, pp. 8638-8643, vol. 111, American Chemical Society.
Lide David R., et al., CRC Handbook of Chemistry and Physics (82nd Edition),2001-2002, CRC Press.
Sajeev U.S., et al., "Control of nanostructures in PVA, PVA/chitosan blends and PCL through electrospinning," Bulletin of Material Science, Jun. 2008, pp. 343-351, vol. 31, Indian Academy of Sciences.

* cited by examiner

BROADBAND OPTICAL LIMITER BASED ON NANO-GRAPHENE AND METHOD OF FABRICATING SAME

CROSS-REFERENCE TO RELATED PATENT APPLICATION

This application claims priority to and the benefit of, pursuant to 35 U.S.C. §119(e), U.S. provisional patent application Ser. No. 61/214,762, filed Apr. 28, 2009, entitled "Nano-Graphene Broadband Optical Limiters," by W. Zhao et al., which is incorporated herein in their entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [18] represents the 18th reference cited in the reference list, namely, Y. Xu, P. E. Pehrsson, L. Chen, R. Zhang, W. Zhao, *J. Phys. Chem. C.* 111 (2007) 8638-8643. Double Stranded DNA-Single Walled Carbon Nanotube Hybrids for Optical Hydrogen Peroxide and Glucose Sensing.

FIELD OF THE INVENTION

The present invention is generally related to an optical limiter, and, more particularly, is related to nano-graphene based broadband optical limiters with tunable dynamic and spectral responses ranging from the ultraviolet to the infrared and methods of fabricating same.

BACKGROUND OF THE INVENTION

As lasers become more powerful, the need for protection becomes greater. Accidental discharges or their use as a weapon makes protection from them an increasing necessity. Just as the bulletproof vest significantly decreased fatalities from guns, laser proof armor may decrease injuries or deaths because of lasers. Damage to human eyes and optical sensors can be reduced by the use of optical limiting, with new materials and devices that have a high linear transmission up to a predetermined input energy, above which the nonlinear properties of the materials or devices limit the transmission of light. In past decades, various materials including organic dyes, carbon black suspensions, organometallics, fullerenes, semiconductors, liquid crystals, and nanostructures, were studied as optical limiters [1]. However, for practical applications, there is still no single material or limiting mechanism that can meet the stringent application requirements [2]. For example, $C_{60}$ solutions are benchmark standards for optical limiters at 532 nm; however, they suffer from a low damage threshold and are not a broadband optical limiter. Carbon black (CB) suspensions are benchmark standards for broadband optical limiters. However, they do not work well for short pulses such as picosecond pulses. They present a turnover behavior at a 10-Hz repetition rate in some solvents with relatively high viscosities [3, 4] and lose stability over time due to carbon particle aggregation.

Therefore, a heretofore unaddressed need exists in the art to address the aforementioned deficiencies and inadequacies.

SUMMARY OF THE INVENTION

One of the objectives of the present invention is to provide nano-graphene based broadband optical limiters with tunable dynamic and spectral responses ranging from the ultraviolet to the infrared for protecting human eye and optical sensors from high power lasers. The nano-graphene based broadband optical limiters are superior to the current standards, carbon fullerenes ($C_{60}$) and carbon black. Superior limiting performance of the nano-graphene based broadband optical limiters is retained regardless of solvent viscosity and polarity. Graphene suspensions in organic solvents can work under 10 Hz laser pulses without losing excellent limiting performance. More significantly, the outstanding limiting properties are also preserved in a gel matrix, suggesting solid device applications. The optical limiting responses of the nano-graphene based broadband optical limiters could be attributed to the presence of $\pi$ conjugation in graphene.

In one aspect of the present invention, the method of fabricating a broadband optical limiter includes the steps of preparing a solution comprising a plurality of graphene nano-sheets suspended in water, preparing a solution of a reagent dissolved in a buffer, and mixing the starting graphene suspension with the reagent solution to form a mixture with a stabilized graphene suspension. Each of the plurality of graphene nano-sheets has lateral dimensions with widths and lengths ranging from a few nanometers to a few thousand nanometers, and a thickness of about 1 nm.

In one embodiment, the reagent includes double-stranded deoxyribonucleic acid (dsDNA). The buffer includes tris (hydroxymethyl)-aminomethane (Tris)

The mixing step, in one embodiment, includes the step of sonicating the mixture at a first temperature after the mixing step so that the dsDNA is unzipped, and the unzipped DNA is coated on the plurality of graphene nano-sheets. The first temperature is about 80° C.

In one embodiment, the method further has the step of dispersing the starting graphene suspension in an organic solvent. The organic solvent is selected from the group consisting of acetonitrile (ACN), tetrahydrofuran (THF), N,N-dimethylformamide (DMF), and a mixture of DMF and carbon disulfide ($CS_2$). In one embodiment, the volume ratio of DMF to $CS_2$ in the mixture of DMF and $CS_2$ is about 1:1.

In another embodiment, the method also has the step of dispersing the mixture after the mixing step in a polyvinyl alcohol (PVA) solution. The dispersing step further comprises the steps of mixing the mixture of graphene and dsDNA with a borax solution, and mixing the mixture with the PVA solution.

Additionally, the method may have the step of reducing chloroauric acid ($HAuCl_4$) with the mixture after the mixing step to form a suspension of gold-graphene composite, where the suspension of gold-graphene composite comprises a plurality of gold particles, the size of each of the plurality of gold particles being about 150 to 200 nm.

In another aspect, the present invention relates to an article of manufacture made by the method disclosed above.

In an alternative aspect of the present invention, the broadband optical limiter characterized with an optical limiting response has a plurality of graphene nano-sheets, and a base material in which the plurality of graphene nano-sheets is distributed. Each of the plurality of graphene nano-sheets has lateral dimensions of about 200 nm by 300 nm, and a thickness of about 1 nm.

In one embodiment, the base material is a liquid. The liquid contains water and a solution of a reagent dissolved in a buffer. The reagent includes dsDNA. The buffer includes Tris. In operation, the broadband optical limiter is sonicated at a first temperature so that the dsDNA is unzipped, and the unzipped DNA is coated on the plurality of graphene nano-sheets. The first temperature is about 80° C.

In another embodiment, the base material is a gel matrix. The polymer gel matrix comprises a poly(vinyl alcohol) gel.

In one embodiment, the broadband optical limiter is dispersed in an organic solvent. The organic solvent is selected from the group consisting of ACN, THF, DMF, and a mixture of DMF and $CS_2$. In one embodiment, the volume ratio of DMF to $CS_2$ in the mixture of DMF and $CS_2$ is about 1:1.

In one embodiment, the optical limiting response is controllable by varying the viscosity and polarity of the organic solvent.

In another embodiment, the optical limiting response is superior to that of a fullerene $C_{60}$ solution and a carbon black suspension.

In yet another embodiment, the optical limiting response is controllable by changing at least one of graphene sizes, $\pi$ conjugation and degrees of chemical functionalization.

In a further embodiment, the optical limiting response is controllable by forming composites with optical limiting materials including gold nanoparticles.

In yet a further embodiment, the optical limiting response is controllable by introducing species into graphene 2D network, and wherein the species includes epoxide, hydroxyl, carbonyl and carboxyl groups.

In an alternative embodiment, the optical limiting response exists from UV to IR wavelengths independently.

The broadband optical limiter is dispersible in aqueous, organic solvents and gels.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
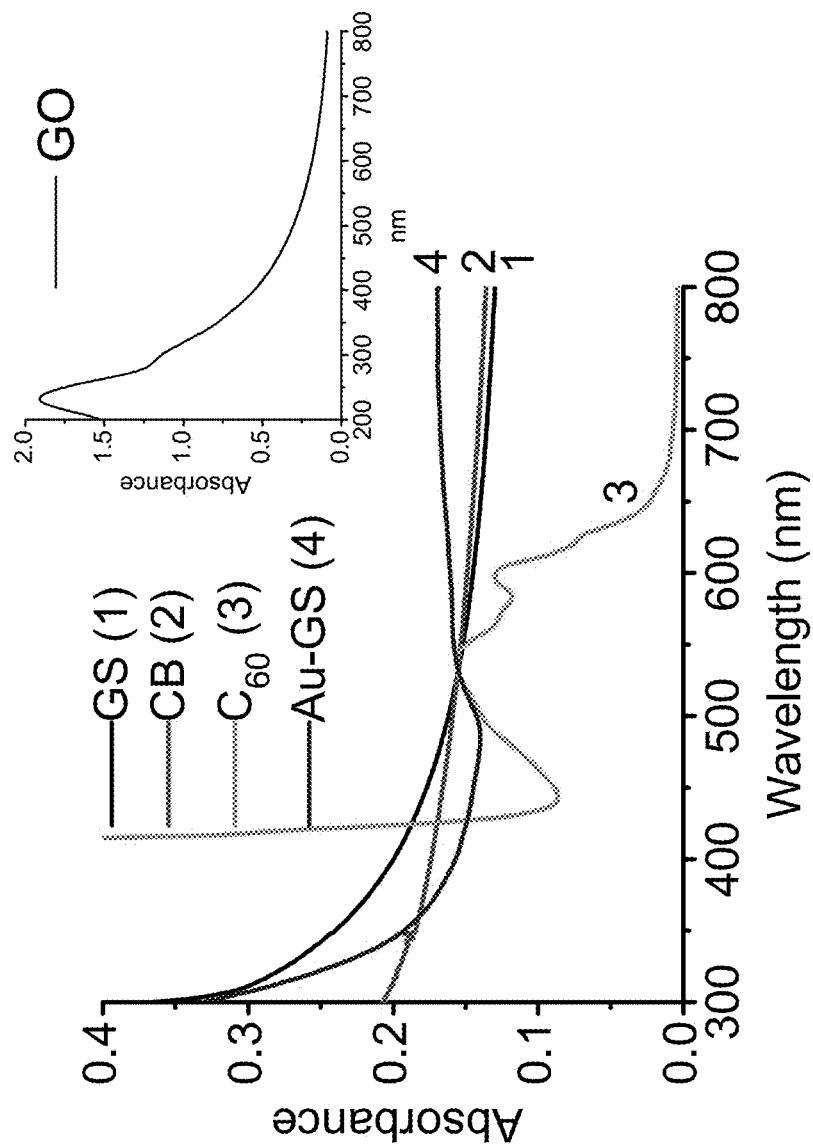
FIG. 1 shows absorption spectra of suspensions of graphene sheets (GS), carbon black (CB), and Au-GS composite, and of $C_{60}$ solution in orthoxylene, where the inset is graphene oxide (GO) absorption spectrum.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-8. In accordance with the purposes of this disclosure, as embodied and broadly described herein, this disclosure, in one aspect, relates to a nano-graphene based broadband optical limiter with tunable dynamic and spectral responses ranging from the ultraviolet to the infrared and methods of fabricating same.

OVERVIEW OF THE INVENTION

Graphene has recently emerged as a next generation material, with a flat monolayer of carbon atoms packed tightly into a two-dimensional (2D) honeycomb lattice, a structure that has been thought impossible to exist in the free state [5]. It is the basic building block for graphitic materials of all other dimensionalities including 0D fullerenes, 1D nanotubes, and 3D graphite. By varying its size, 2D graphene can be also turned into 0D dots and 1D nanoribbons. Even 2D graphene can be specifically single-, double-, and few- (3 to 10) layered, arranged in three different types of 2D crystals. These structures may possess significantly different electronic and optical properties. For example, 2D single-layer graphene is a zero-gap semiconductor with one type of electron and one type of hole [5], while quasi-2D graphene ribbons, by shrinking one of the dimensions of 2D graphene to less than 10 nm, are all semiconductors [6]. As a new material, graphene absorbs 2.3% of incident white light [6]. At a thickness of about 0.335 nm, graphene possesses a large absorption coefficient, about $3.01 \times 10^5$ cm$^{-1}$, about ten times larger than carbon black's [3] and 70 times that of GaAs [8].

In addition to its various structural arrangements and properties, 2D graphene offers a second dimension for chemical functionalization, either on the 2D conjugated network or on the edges. By applying electric field [5] or chemical functionalization [9], a graphene bilayer may turn into a semiconductor with a tunable band gap $E_g$ from zero to about 0.3 eV. This type of narrow band gap semiconductors may be of potential applications for infrared (IR) optical limiters due to their expected large two photon absorption that is proportional to $E_g^{-3}$ [2, 10] as well as their large nonlinear refractive index $n_2$ that is proportional to $E_g^{-4}$ [11]. The unusual tunable band gap property of bilayer graphene may allow the TPA at a particular wavelength to be tailored for a specific application. For example, when tuning $E_g \approx 0.2$ eV (about 6 μm) by chemical functionalization [9], TPA may cover a wavelength range of about 6-12 μm, an important window for IR optical limiting applications [2].

There are a few research groups that have explored the structure-nonlinear optical (NLO) property relationships of graphene samples after we conducted the first measurement. Tian's group observed large NLO properties in graphene oxide (GO) and strong optical limiting responses in a GO-porphyrin hybrid [12-14]. Loh's group found that the optical transmittance and limiting properties of GO and graphene are sensitive to the oxygen functional groups and structural defects and demonstrated the tunable optical limiting performance of GO and graphene [15]. Blau's group observed a significant NLO response of graphene dispersions in selected organic solvents to nanosecond laser pulses at about 532 nm and about 1064 nm [16].

In one aspect of the present invention, a low-cost, nano-graphene based broadband optical limiter with limiting properties superior to current standards, carbon fullerenes ($C_{60}$) solutions and CB suspensions is disclosed. The presence of π conjugation improves the optical limiting responses. Superior limiting performance of graphene is retained regardless of solvent viscosity and polarity, a unique feature not observed in $C_{60}$ and CB. Graphene suspensions in organic solvents can work under 10 Hz laser pulses without losing the excellent limiting performance. No turnover behaviors are observed in graphene and graphene oxide aqueous suspensions. The outstanding limiting properties are also preserved in a gel matrix. These graphene-based optical limiters can work in solutions and solid matrixes for devices used for protecting human eyes and optical sensors from high power lasers.

The broadband optical limiter, in one embodiment, includes a plurality of graphene nano-sheets, and a base material in which the plurality of graphene nano-sheets is distributed. Each of the plurality of graphene nano-sheets has lateral dimensions of about 200 nm by 300 nm, and a thickness of about 1 nm.

The base material can be liquid or solid matrix. The liquid comprises water and a solution of a reagent dissolved in a buffer. The reagent includes, but not limited to, dsDNA. The buffer includes, for example, Tris.

The broadband optical limiter is sonicated at a temperature about 80° C. so that the dsDNA is unzipped, and the unzipped DNA is coated on the plurality of graphene nano-sheets.

In one embodiment, the broadband optical limiter is dispersed in an organic solvent. The organic solvent includes ACN, THF, DMF, or a mixture of DMF and $CS_2$ with the volume ratio of DMF to $CS_2$ about 1:1. In another embodiment, the broadband optical limiter is dispersed in a PVA gel.

According to the present invention, the broadband optical limiter is dispersible in aqueous, organic solvents and gels.

Another aspect of the present invention provides a method of fabricating such a broadband optical limiter. In one embodiment, the method includes the steps of preparing a solution comprising a plurality of graphene nano-sheets suspended in water, preparing a solution of a reagent dissolved in a buffer, and mixing the starting graphene suspension with the reagent solution to form a mixture with a stabilized graphene suspension. Each of the plurality of graphene nano-sheets has lateral dimensions of about 200 nm by 300 nm, and a thickness of about 1 nm, typical for a single-layer graphene.

The reagent, in one embodiment, includes dsDNA. The buffer includes Tris.

The mixing step includes the step of sonicating the mixture at a first temperature after the mixing step so that the dsDNA is unzipped, and the unzipped DNA is coated on the plurality of graphene nano-sheets. The first temperature is about 80° C.

The method further includes the step of dispersing the mixture after the mixing step in an organic solvent. The organic solvent contains ACN, THF, DMF, or a mixture of DMF and $CS_2$ with the volume ratio of DMF to $CS_2$ about 1:1.

Additionally, the method also has the step of dispersing the mixture after the mixing step in a PVA gel. In one embodiment, the dispersing step comprises the steps of mixing the mixture of graphene and dsDNA with a borax solution, and mixing the mixture with the PVA solution.

Moreover, the method has the step of reducing $HAuCl_4$ with the mixture after the mixing step to form a suspension of gold-graphene composite, where the suspension of gold-graphene composite comprises a plurality of gold particles, the size of each of the plurality of gold particles being about 150 to 200 nm.

In yet another aspect, the present invention relates to an article of manufacture made by the method disclosed above.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Materials:

Graphene nanosheets and graphene oxide nanosheets suspended in water were made from [17]. Water soluble carbon black was purchased from Acheson Colloids Co., (Port Huron, Mich.). Fullerene $C_{60}$ (99.5+% pure) was from Lancaster Synthesis Ltd., (Lancashire, Great Britain). Reagents including double-strand DNA (dsDNA) (sodium salt from salmon testes), sodium dodecyl sulfate (SDS, purity>99%), about 30 wt % hydrogen chloroaurate in dilute HCl solution ($HAuCl_4$, 99.99%), tris(hydroxymethyl)-aminomethane (Tris, >99.9%), orthoxylene (98%), acetonitrile (ACN, 99.9%), tetrahydrofuran (THF, 99.9%), N,N-dimethylformamide (DMF, 99.9+%), and carbon disulfide ($CS_2$, 99.9+%) were purchased from Sigma-Aldrich Corp., (St. Louis, Mo.). Polyvinyl alcohol (PVA, 99-100% hydrolyzed, molecular weight=93,000) was from Eastman Kodak Co. (Rochester, N.Y.). Borax (sodium borate, tetra crystals) was from Fischer Scientific Inc., (Pittsburgh, Pa.). The buffer solution was Tris buffer (about 10 mM, pH 8.0).

Preparation of Graphene, Carbon Black, and Au-Graphene Aqueous Suspensions and $C_{60}$ Solutions:

Graphene sheets have dimensions of about 200 by 300 nm with a thickness of about 1 nm, typical for a single-layer graphene [17]. An aqueous suspension of graphene sheets (GS) was unstable over a period of time or under shaking Therefore, a surface functionalization approach using DNA was adopted to stabilize it [18]. A dsDNA solution was prepared by dissolving 10 mg dsDNA in about 5 mL Tris buffer. About 1 mL of GS suspension (about 0.2 mg GS/mL) was added into the solution. The mixture was sonicated (Sonics model VCX 130 PB, 20 kHz, output power about 8 W) in a hot bath, temperature reaching about 80° C., which allowed the double stranded DNA to unzip and coat on graphene, stabilizing it in solution [18]. For comparing size effects, three GS samples, GS1, GS2 and GS3, with the size of GS1 larger than the size of GS2 that in turn, is larger than the size of GS3 were also prepared by a simple centrifugation process. The graphene oxide (GO) aqueous suspension was stable over a long period of time. It was diluted with distilled water to the appropriate concentration. The carbon black (CB) suspension was prepared by dissolving water-soluble carbon black (about 0.1 mg) in about 5 mL of distilled water or about 1 wt % SDS aqueous solution with a mild sonication. A saturated $C_{60}$ solution was made by dissolving excess amounts in about 1 mL orthoxylene. Lastly, a suspension (about 1 mL) of a Au-Graphene (Au-GS) composite was prepared by reducing $HAuCl_4$ (5 μL in 300 μL Tris buffer) with the DNA-graphene suspension (about 0.1 mL) at pH 9.5, adjusted with about 0.5 M NaOH, then adjusted back to pH 8 in Tris buffer using 0.1 M HCl. The pH was monitored by using an Orion model 420 pH meter with a Fisher AccupHast Microprobe electrode. The size of the Au particles is about 150-200 nm, composed of a few smaller gold nanoparticles, as revealed by TEM. Next, all samples of suspensions or solutions were hosted in 1 mm quartz cells, measuring their optical absorption spectra in a Varian Cary 5000 UV-Vis-NIR spectrophotometer. The samples' concentrations were adjusted to optimal transmittance, about 70% transmittance at about 532 nm (pathlength 1 mm). After concentration adjustment, the samples were transferred to about 1 mm quartz cuvettes for optical limiting measurements. For mechanism studies, GS and GO suspensions in 1 cm quartz cuvettes with about 50% transmittance at about 532 nm were also prepared.

Graphene Suspensions in Organic Solvents and PVA Gel:

To test the effects of different solvents on limiting, GS were dispersed in ACN, THF, DMF, and a mixture of DMF and $CS_2$ (v:v=1:1). The starting GS suspension (about 0.2 mL) was centrifuged at about 16,000 g in a VWR Galaxy 16 Microcentrifuge for about 10 min. The top water layer was carefully decanted, leaving the water saturated GS precipitate. About 1 mL of an above-mentioned solvent was added into the GS precipitate, which was then sonicated in an ultrasonic bath (Branson Model 1510R-MT, 42 kHz, output power about 70 W) about 3-5 min to disperse the GS. GS suspensions in the organic solvents were stable over a few days, long enough to take optical measurements. The absorption spectra of the suspensions were taken using 1 mm quartz cells; then each solution's concentration was adjusted to give about 50% linear transmittance at about 532 nm (pathlength 10 mm). Preparation of GS in a PVA gel was performed by mixing dsDNA-GS suspension in a calculated volume with about 4 wt % borax aqueous solution; this mixture was added to about 4 wt % PVA aqueous solution in a about 1:9 volume ratio of borax solution to PVA solution. The resulting mixture was homogenized in a hot water bath of about 70° C. and then allowed to sit over night to allow air bubbles to leave the gel. The resulting GS-PVA gel has a linear transmittance about 50% at about 532 nm with a pathlength of about 10 mm. The above samples were transferred into 1 cm quartz cuvettes for optical limiting measurements.

Optical Limiting Measurements:

The laser used in the limiting experiments was a Continuum Powerlite Precision II Series Model 8000 Injection Seeded Nd:YAG nanosecond (ns) pulsed laser with output λ=1064.2 nm. The laser was used to pump two LaserVision optical parametric oscillators and optical parametric amplifier systems to generate two adjustable laser beams covering about 532 nm to about 5 μm. Here, two laser beams of wavelength about 532 nm and about 730 nm were used to examine the broadband limiting properties of the samples.

The 532 nm laser beam was passed through a $CaF_2$ lens with a focus length of about 50 cm, and focused onto the samples. The focus diameter was about 100 μm. The intensity of the laser before ($I_0$) and after (I) passing the sample was recorded with a pyroelectric detector (J8LP, Coherent-Molectron, Inc.) which was connected to a computer with a National Instruments data processing board and a LabView program. The transmittance T ($I/I_0$) was then measured as a function of laser incident energy (J) or incident fluence ($J/cm^2$). The input power was varied using a series of optical filters with different optical densities. Unless otherwise stated, the limiting data were taken for the first laser shot. The data gathering steps were repeated with the red laser beam of about 730 nm, focus size about 600 μm. For each sample, the transmittance T was measured a minimum of 3 times at each input power. For all data sets, the average standard deviation was less than 10%, within reasonable margin of error for nonlinear optical measurements.

The data logs for GS and GO suspensions were transferred to Origin software program, treated and graphed by plotting output fluence as a function of input fluence. The graphene data were analyzed and compared with data of carbon black, $C_{60}$, and Au-graphene in order to evaluate its effectiveness. The limiting mechanisms were also explored by fitting selected data with a two photon absorption equation [2]. The limiting data for graphene in organic solvents and PVA was graphed by plotting normalized transmittance as a function of input energy. The limiting threshold, defined as the input power at about 50% of the linear transmittance, was determined from the plot of each sample.

Linear Absorption and Optical Limiting Responses of Graphene in Aqueous Suspensions:

The absorption spectra of the samples are shown in FIG. 1. All but $C_{60}$ have broad absorption extended into the infrared region. In comparison, the GO becomes less absorptive in the visible and near infrared due to disrupted π-conjugation.

Figure 2:
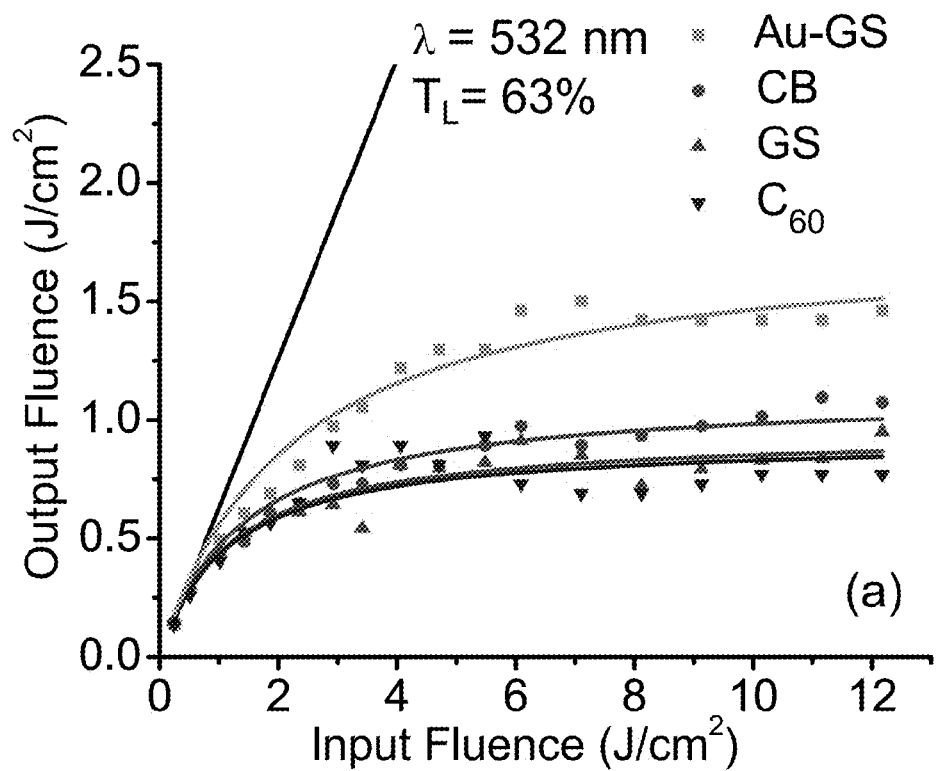
FIG. 2 shows optical limiting responses of aqueous suspensions of GS, Au-GS and CB, and of $C_{60}$ solution in orthoxylene at about 532 nm (a) and about 730 nm (b), respectively, where the linear transmittance $T_L$ is about 63% for all samples at about 532 nm. For the same samples at about 730 nm, $T_L$=70% for GS, about 60% for Au-GS, about 70% for CB, and about 90% for $C_{60}$. For the comparison among the samples, the linear transmittance $T_L$ is normalized to 1 in plotting the figure at right.
Figure 2:
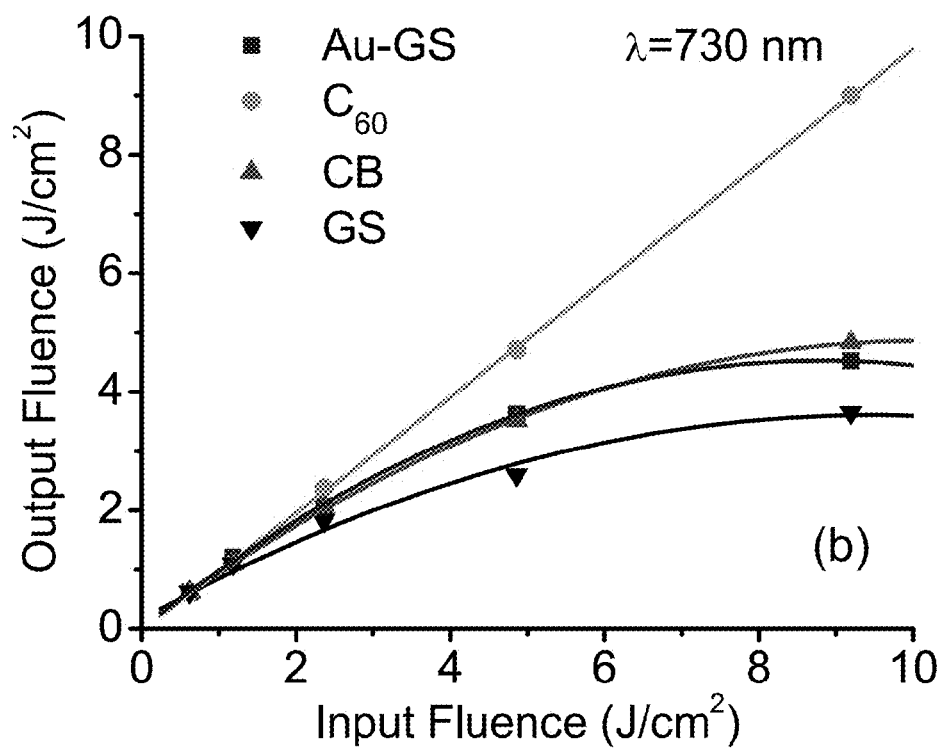

The optical limiting responses of these samples are shown in FIG. 2 with ns pulsed lasers under single shots. At about 532 nm, GS has a comparable limiting response with that of $C_{60}$, and is superior to the CB suspension and the Au-GS suspension. GS is also a broadband limiter, as shown by its optical limiting behavior at about 730 nm, which outperforms the CB suspension and the Au-GS suspension. There is no limiting response for $C_{60}$ at about 730 nm.

Figure 3:
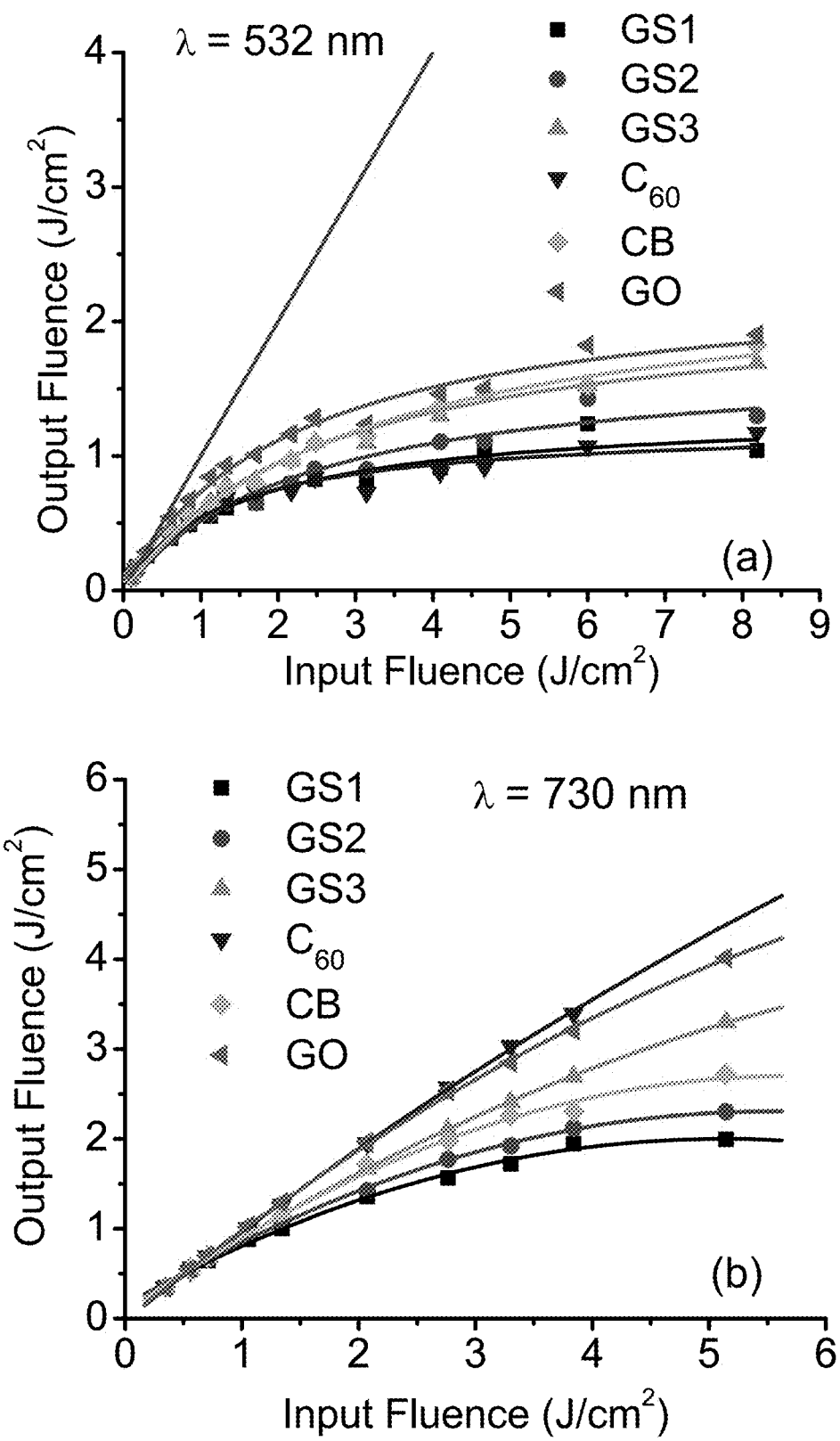
FIG. 3 shows optical limiting responses of aqueous suspensions of graphene sheets (GS1, GS2, GS3), GO and CB, and of $C_{60}$ solution in orthoxylene at about 532 nm (a) and 730 nm (b), respectively. $T_L$ at 532 nm is about 63% for samples GS1, GS2, GS3 and CB, about 56% for GO and $C_{60}$. For the same samples at 730 nm, $T_L$=67% for GS1, GS2, GS3, about 68% for CB, about 73% for GO, and about 81% for $C_{60}$. For the comparison, the linear transmittance $T_L$ is normalized to 1 for plotting both figures.

The size effects of GS samples were also examined. The optical limiting responses of the samples are shown in FIG. 3. At about 532 nm, all GS samples are superior to the CB suspension and the GO suspension. GS1 sample has a limiting response comparable to that of $C_{60}$. At about 730 nm, GS1 and GS2 samples outperform the CB suspension, while GO is a weak optical limiter, close to $C_{60}$.

Limiting Performance and Limiting Mechanisms of Graphene and Graphene Oxide:

The extended π-conjugation and defects may play an active role in the optical limiting behaviors.

Figure 4:
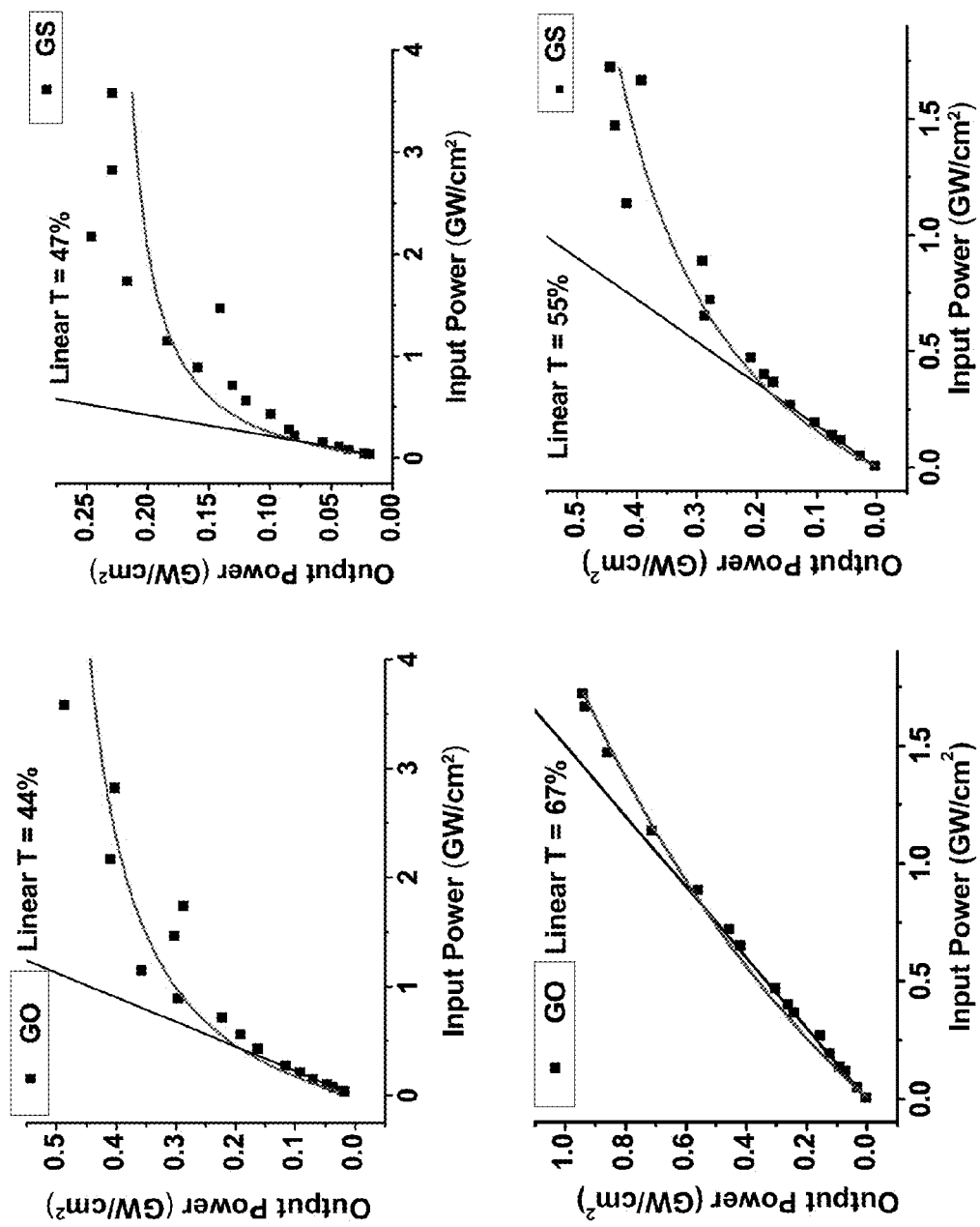
FIG. 4 shows a limiting comparison of aqueous suspensions of GS and GO for about 532 nm at top, about 730 nm at bottom, path length about 1 cm, where curved lines are fitting lines with TPA equation [2].
Figure 5:
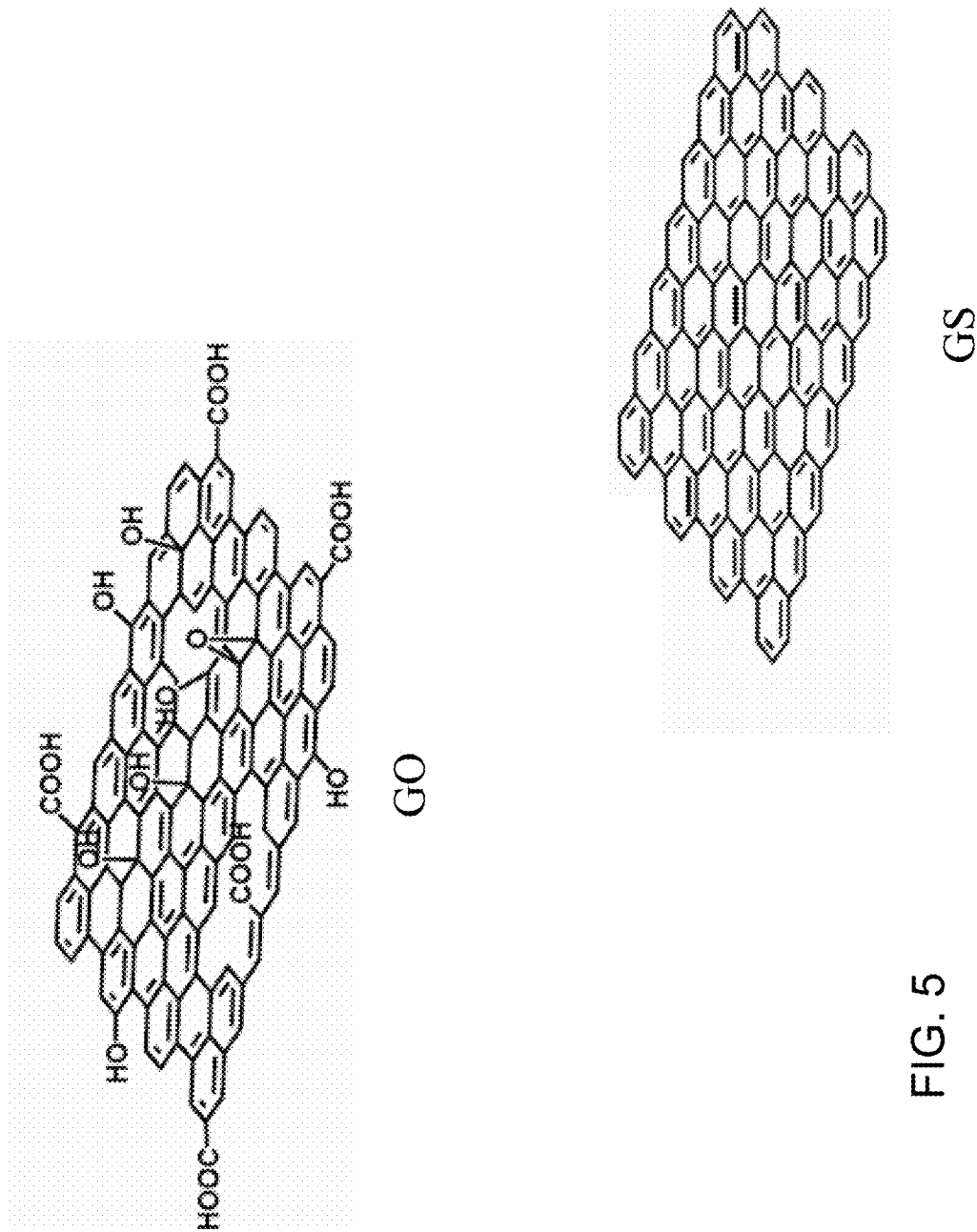
FIG. 5 shows structural diagrams of GO and GS.

The limiting response of GS is better than that of GO as shown in FIG. 4; examination of the scales of each graph shows GS limiting almost twice as well. This difference may be related to the degree of π conjugation in the samples. As shown in FIG. 5, GS has extended π conjugation, while in GO, the π conjugation is disrupted due to defects including epoxide, hydroxyl, carbonyl and carboxyl groups [17]. The results suggest that extended π conjugation enhances limiting performance.

Two-photon absorption (TPA) equation [2] was used to fit the data sets in FIG. 4. The obtained TPA absorption coefficients are largest for GS in both green and red wavelengths. From the fitting, it also appears that GO has a better fit with the TPA equation; GS does not fit very well. This may indicate that GO's TPA effects contribute more significantly to its limiting. GS may also have more complicated mechanisms involved in addition to TPA, possibly nonlinear scattering and nonlinear refraction [3, 4].

Figure 6:
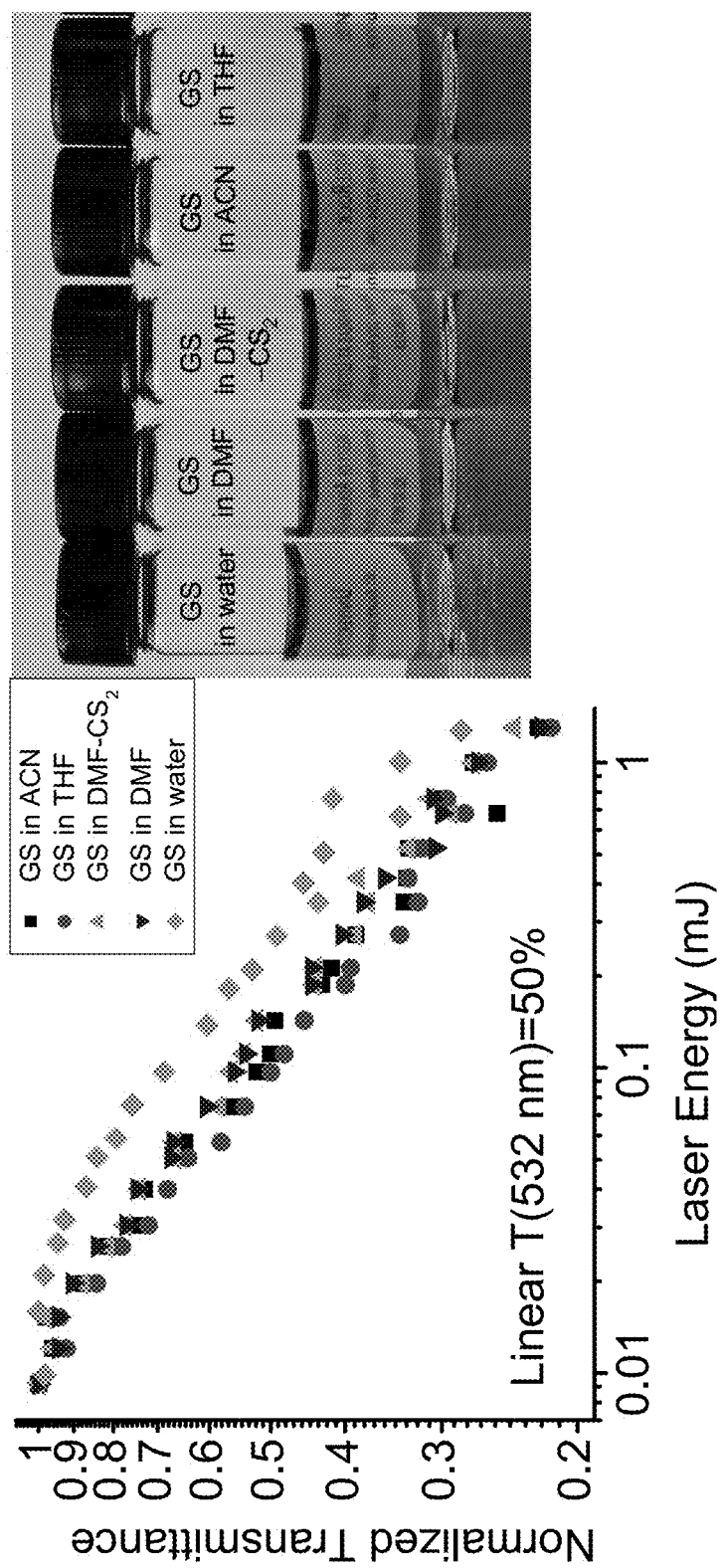
FIG. 6 shows optical limiting responses of various GS suspensions in aqueous and organic solvents.

Optical Limiting Responses of Graphene in Organic Suspensions:

The optical limiting responses of GR in organic solvents are superior to that of GR in aqueous solution as shown in FIG. 6. The viscosity and polarity of solvents with their respective limiting thresholds are listed in Table 1. Graphene in THF performs the best with the lowest limiting threshold. It is known that the optical limiting behaviors are related to the viscosity and the polarity of the host solvent [3]. Here the viscosities of the solvents used follow the order: water (0.890)>DMF (0.794)>THF (0.456)>DMF–$CS_2$ (0.415) >acetonitrile (ACN) (0.369)>$CS_2$ (0.352); while their polarities (dielectric constant) follow water (80.1)>DMF (38.25) >ACN (36.64)>DMF–$CS_2$>THF (7.52)>$CS_2$ (2.63). Clearly, the lower viscosity solvents like THF and ACN performed better than higher viscosity solvents such as water. However, there is one exception here. DMF has similar viscosity to water, but the former has a better limiting response than the later. This difference might be related to the difference in their polarities.

TABLE 1

Solvent Viscosities, Dielectric Constants and Experimental Limiting Thresholds for GR Suspensions

| Environment | Viscosity[19] (mPa · s) | Polarity (Dielectric constant[19]) | Limiting Threshold (mJ) |
|---|---|---|---|
| Water | 0.890 | 80.1 | 0.25 |
| DMF | 0.794 | 38.25 | 0.15 |
| THF | 0.456 | 7.52 | 0.097 |
| ACN | 0.369 | 36.64 | 0.11 |
| $CS_2$ | 0.352 | 2.63 | — |
| DMF-$CS_2$ | 0.415 | — | 0.15 |
| PVA | 528[20] | — | 0.20 |

Figure 7:
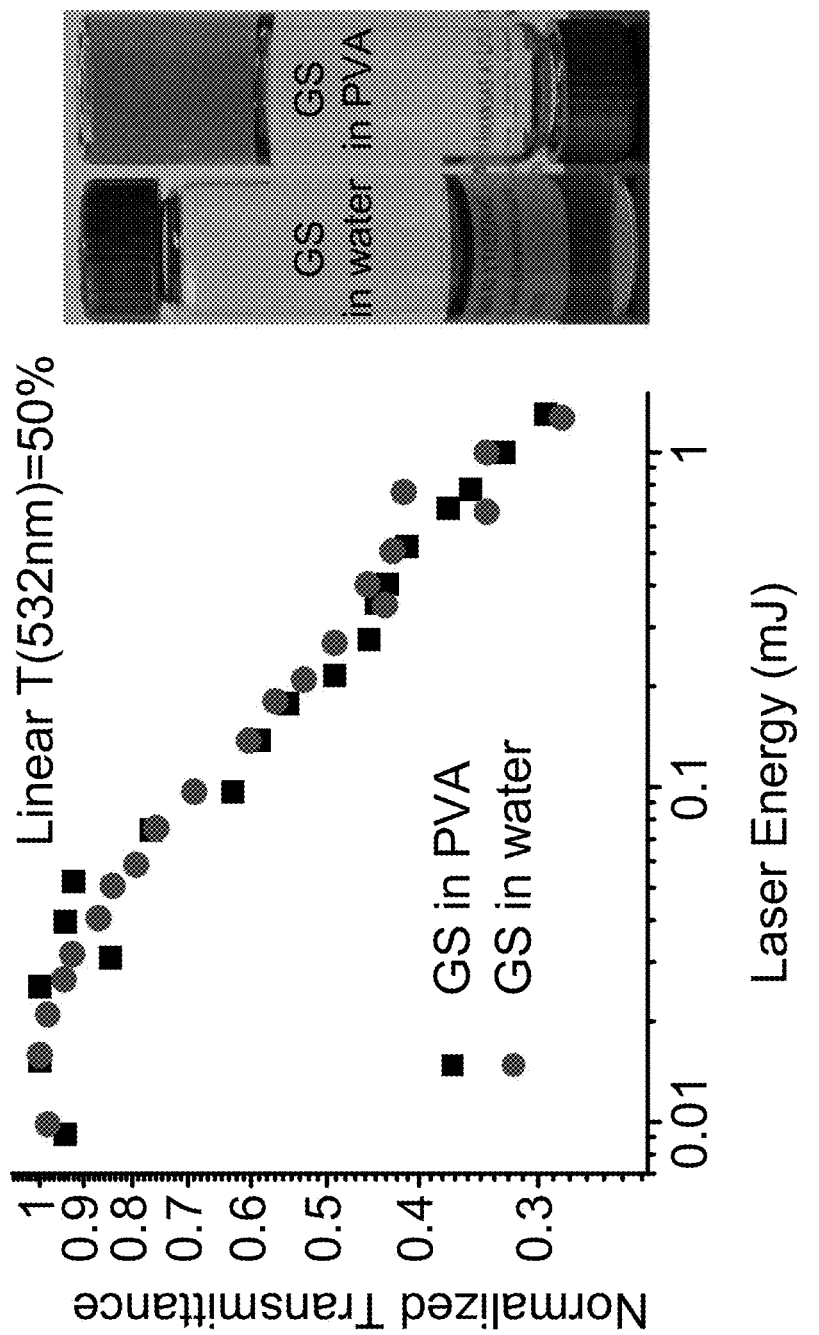
FIG. 7 shows a comparison of optical limiting responses of GS in a polymer matrix PVA gel with an aqueous GS suspension.

Optical Limiting Responses of Graphene in a Polymer Gel Matrix:

The optical limiting behaviors of GR in a polymer gel, PVA were also investigated in order to explore the possible device application. As shown in FIG. 7, having a linear transmittance of about 50% at about 532 nm with 1 cm pathlength, the GR in PVA has the same optical limiting performance as the GR aqueous suspension, one of the best optical limiting samples in this example. This result is significant, the first demonstration of excellent optical limiting performance preserved in a polymer gel matrix, indicating great promise for solid optical limiting devices.

Figure 8:
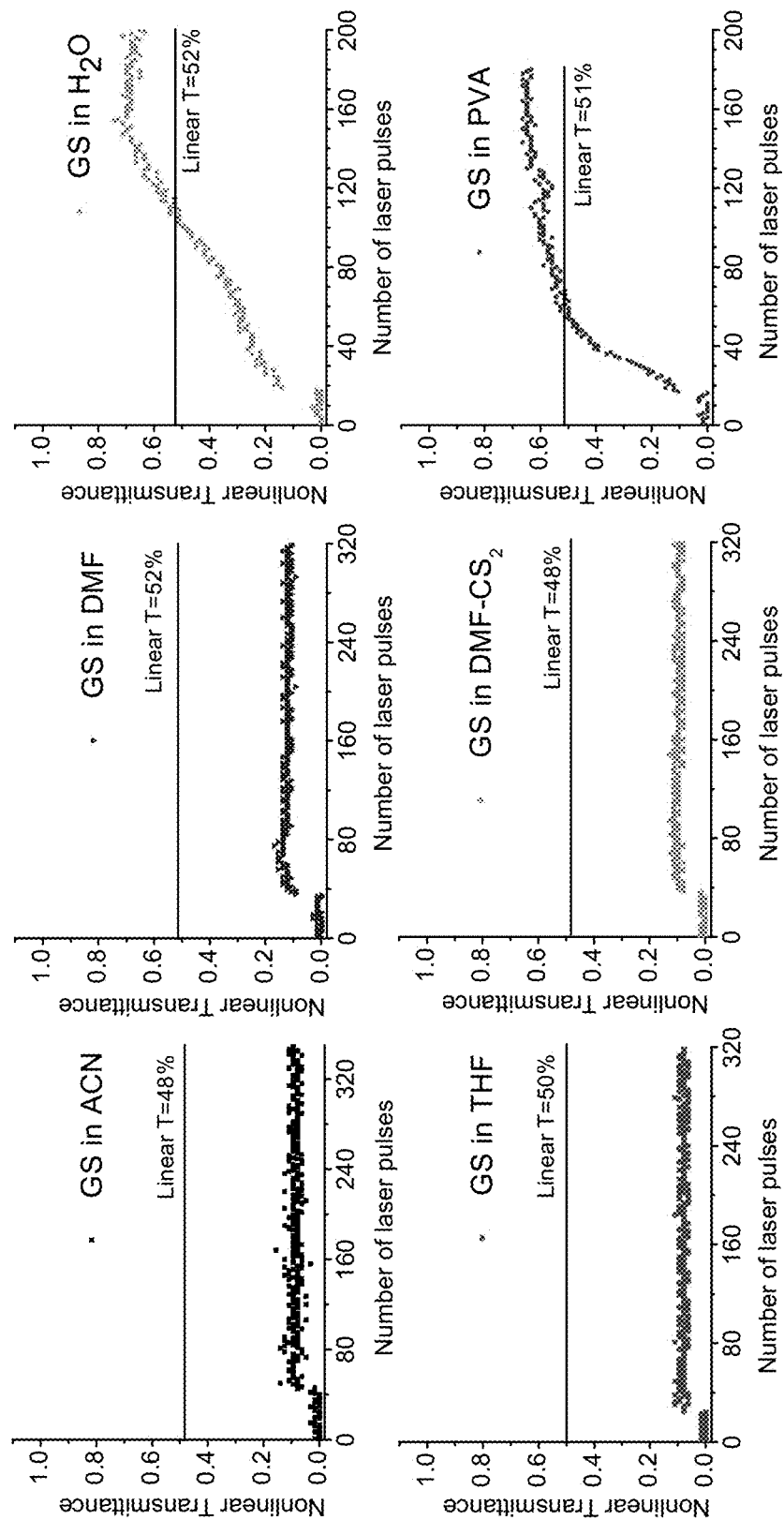
FIG. 8 shows nonlinear transmittance change as a function of number of laser pulses (about 532 nm, about 0.78 mJ, about 10 Hz) for GS in different solvents and in PVA gel.

Optical Limiting Responses of Graphene Under 10 Hz Pulses:

As shown in FIG. 8, GR samples in organic solvents also shows one more notable limiting property; they work as optical limiters for 10 Hz pulses, a more challenging condition for CB [3, 4]. Limiting takes place in the organic solvents fairly well under continuing 10 Hz pulse shots. For GR in water and PVA, the limiting goes well at first a few shots, then bleaching and subsequent loss of limiting occurs under continuing shots. In addition, no turnover behavior was observed even under high input fluences, a behavior significantly different from CB suspensions [4]. This interesting result suggests GR and GO performs differently from CB with better optical limiting responses.

In summary, graphene was superior as a broadband optical limiter to the $C_{60}$ solution and the carbon black suspension, the best limiters currently available. Further examination indicated that the presence of π conjugation improves the optical limiting responses. Superior limiting performance was retained regardless of solvent viscosity and polarity, a feature not observed before. Graphene suspensions in organic solvents can work under 10 Hz laser pulses without losing excellent limiting performance. More significantly, the outstanding limiting properties are also preserved in a gel matrix, suggesting possible solid device applications.

According to the invention, the nano-graphene based broadband optical limiter has advantages over conventional limiters. Among them, the advantages include Superior optical limiting responses to current standards, $C_{60}$ and carbon black, Low-cost, Broadband covering from UV to IR wavelengths independently, High linear transmittance, High chemical stability, High resistance to permanent laser-induced damage, Soluble in aqueous and organic solvents for easy device processibility, Workable in solutions and solid matrixes, Various structures available for tailoring at a molecular level, Enable various ways of chemical functionalization for desired optical limiting properties for specific applications, Broad dynamic ranges for laser energy limiting, Tunable dynamic responses, workable for lasers of short and long pulses.

Tunable optical limiting responses with tunable bandgaps by applying an electric field or chemical functionalizations for specific applications, Controllable optical limiting properties by tuning graphene sizes (few nanometers to a few thousand nanometers), $\pi$ conjugation and degrees of chemical functionalization, Controllable optical limiting properties by forming charetransfer complexes, Controllable optical limiting properties by introducing various atomic species such as $Zn^{2+}$ and $Cu^{2+}$ ions into graphene 2D network, Controllable optical limiting properties by varying solvents' viscosity and polarity, Controllable optical limiting properties by varying solid matrixes such as polymers including polyvinyl butyral, polystyrene, and poly(vinyl alcohol), etc., Workable with various optical limiting materials for composites for specific applications, and Enable different optical limiting mechanisms working constructively in the same graphene nanostructures or composites.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

REFERENCE LIST

[1] Y.-P. Sun, J. E. Riggs, *Inter. Rev. Phys. Chem.* 18 (1999) 43-90. Organic and Inorganic Optical Limiting Materials. From Fullerenes to Nanoparticles.

[2] G. L. Wood, A. G. Mott, E. J. Sharp, *Proc. SPIE* 1692 (1992) 2-14. Materials Requirements for Optical Limiting.

[3] K. Mansour, M. J. Soileau, E. W. Van Stryland, *J. Opt. Soc. Am. B* 9 (1992) 1100-1109. Nonlinear Optical Properties of Carbon-Black Suspensions (Ink).

[4] F. E. Hernandez, W. Shensky, III, I. Cohanoschi, D. J. Hagan, E. W. Van Stryland, *Appl. Opt.* 41 (2002) 1103-1107. Viscosity Dependence of Optical Limiting in Carbon Black Suspensions.

[5] K. Geim, K. S. Novoselov, *Nature Materials* 6 (2007) 183-191. The Rise of Graphene.

[6] X. Li, X. Wang, L. Zhang, S. Lee, H. Dai, *Science* 319 (2008) 1229-1232. Chemically Derived, Ultrasmooth Graphene Nanoribbon Semiconductors.

[7] R. R. Nair, P. Blake, A. N. Grigorenko, K. S. Novoselov, T. J. Booth, T. Stauber, N. M. R. Peres, A. K. Geim, *Science* 320 (2008) 1308. Fine Structure Constant Defines Visual Transparency of Graphene.

[8] F. Wang, Y. Zhang, C. Tian, C. Girit, A. Zettl, M. Crommie, Y. R. Shen, *Science* 320 (2008) 206-209. Gate-Variable Optical Transitions in Graphene.

[9] Y. H. Lu, W. Chen, Y. P. Feng, and P. M. He, *J. Phys. Chem. B* 113 (2009) 2-5. Tuning the Electronic Structure of Graphene by an Organic Molecule.

[10] V. Dubikovskiy, D. J. Hagan, E. W. Van Stryland, *J. Opt. Soc. Am. B* 25 (2008) 223-235. Large Nonlinear Refraction in InSb at 10 μm and the Effects of Auger Recombination.

[11] R. W. Boyd, *Nonlinear Optics* (Academic Press, New York, 1992).

[12] Z. Liu, Y. Wang, X. Zhang, Y. Xu, Y. Chen, J. Tian, *Appl. Phys. Lett.* 94 (2009) 021902. Nonlinear Optical Properties of Graphene Oxide in Nanosecond and Picosecond Regimes.

[13] Y. Xu, Z. Liu, X. Zhang, Y. Wang, J. Tian, Y. Huang, Y. Ma, X. Zhang, Y. Chen, *Adv. Mater.* 21 (2009) 1275-1279. A Graphene Hybrid Material Covalently Functionalized with Porphyrin: Synthesis and Optical Limiting Property.

[14] Z. Liu, Y. Xu, X. Zhang, X. Zhang, Y. Chen, J. Tian, *J. Phys. Chem. B* 113 (2009) 9681-9686. Porphyrin and Fullerene Covalently Functionalized Graphene Hybrid Materials with Large Nonlinear Optical Properties.

[15] Y. Zhou, Q. Bao, L. A. L. Tang, Y. Zhong, K. P. Loh, *Chem. Mater.* 21 (2009) 2950-2956. Hydrothermal Dehydration for the "Green" Reduction of Exfoliated Graphene Oxide to Graphene and Demonstration of Tunable Optical Limiting Properties.

[16] J. Wang, Y. Hernandez, M. Lotya, J. N. Coleman, W. J. Blau, *Adv. Mater.* 21 (2009) 2430-2435. Broadband Nonlinear Optical Response of Graphene Dispersions.

[17] D. Li, M. B. Müller, S. Gilje, R. B. Kaner, G. G. Wallace, *Nature Nanotech.* 3 (2008) 101-105. Processable Aqueous Dispersions of Graphene Nanosheets.

[18] Y. Xu, P. E. Pehrsson, L. Chen, R. Zhang, W. Zhao, *J. Phys. Chem. C.* 111 (2007) 8638-8643. Double Stranded DNA-Single Walled Carbon Nanotube Hybrids for Optical Hydrogen Peroxide and Glucose Sensing.

[19] D. R. Lide, *CRC handbook of chemistry and physics* (82nd ed.) (New York, N.Y.: CRC Press, 2002).

[20] U.S. Sajeev, K. A. Anand, D. Menon, S. Nair, *Bulletin of Material Science,* 31(3) (2008) 343-351. Control of nanostructures in PVA, PVA/chitosan blends and PCL through electrospinning.

What is claimed is:

1. An article of manufacture, comprising:
a graphene-based broadband optical limiter, comprising a graphene-polyvinyl alcohol (PVA) gel, wherein the graphene-PVA gel comprises:
(a) a PVA gel as a base material;
(b) a plurality of graphene nano-sheets suspended in the PVA gel; and (c) a coating of single-stranded DNA, formed on the plurality of graphene nano-sheets,
wherein the graphene-PVA gel is made by:
preparing a starting graphene suspension comprising a plurality of graphene nano-sheets suspended in water;
preparing a solution of a reagent dissolved in a buffer, wherein the reagent comprises double-stranded deoxyribonucleic acid (dsDNA);
mixing the starting graphene suspension with the reagent solution to form a mixture, sonicating and heating the mixture such that the dsDNA is unzipped to form the single-stranded DNA, and the single-stranded DNA is coated on the plurality of graphene nano-sheets to form a stabilized graphene suspension;
mixing the stabilized graphene suspension with 4 percent by weight (wt %) borax aqueous solution to form a borax solution;
mixing 1 part of the borax solution with 9 part of a 4 wt % PVA aqueous solution to form a resulting mixture; and
homogenizing the resulting mixture under 70° C. water bath and allowing the resulting mixture to sit overnight, so as to form the graphene-PVA gel,
wherein the graphene-PVA gel has a linear transmittance of about 50% at 532 nm with a path length of about 10 millimeter.

2. An optical limiting device, comprising
a graphene-based broadband optical limiter comprising a stabilized graphene suspension characterized with an optical limiting response of a transmittance as a function of input fluence of an incident light, wherein the stabilized graphene suspension comprises:
(a) a plurality of graphene nano-sheets;
(b) a base material in which the plurality of graphene nano-sheets is suspended, wherein the base material is a polymer gel matrix comprising a poly(vinyl alcohol) gel; and
(c) a coating of single-stranded DNA, formed on the plurality of graphene nano-sheets,
wherein the graphene nano-sheets and the base material are structured to form the optical limiting device that limits laser energy of a laser beam; and
wherein the transmittance decreases from a linear transmittance that is equal to or less than about 70% as the input fluence increases.

3. The optical limiting device of claim 2, wherein each of the plurality of graphene nano-sheets has lateral dimensions of about 200 nm by 300 nm, and a thickness of about 1 nm.

4. The optical limiting device of claim 2, being dispersed in an organic solvent.

5. The optical limiting device of claim 4, wherein the organic solvent is selected from the group consisting of acetonitrile (ACN), tetrahydrofuran (THF), N,N-dimethylformamide (DMF), and a mixture of DMF and carbon disulfide ($CS_2$).

6. The optical limiting device of claim 5, wherein the volume ratio of DMF to $CS_2$ in the mixture of DMF and $CS_2$ is about 1:1.

7. The optical limiting device of claim 4, wherein the optical limiting response is controllable by varying the viscosity and polarity of the organic solvent.

8. The optical limiting device of claim 2, wherein the optical limiting response is superior to that of a fullerene $C_{60}$ solution and a carbon black suspension.

9. The optical limiting device of claim 2, wherein the optical limiting response is controllable by changing at least one of graphene sizes, $\pi$ conjugation and degrees of chemical functionalization.

10. The optical limiting device of claim 2, wherein the optical limiting response is controllable by forming composites with optical limiting materials including gold nanoparticles.

11. The optical limiting device of claim 2, wherein the optical limiting response is controllable by introducing species into graphene 2D network, and wherein the species includes epoxide, hydroxyl, carbonyl and carboxyl groups.

12. The optical limiting device of claim 2, wherein the optical limiting response exists from UV to IR wavelengths independently.

13. The optical limiting device of claim 2, being dispersible in aqueous, organic solvents and gels.

* * * * *